United States Patent [19]

Riddle, Jr.

[11] 4,291,343

[45] * Sep. 22, 1981

[54] FREQUENCY-RATIO APPARATUS

[76] Inventor: Herbert S. Riddle, Jr., Nine Grant Cir., Sharon, Mass. 02067

[*] Notice: The portion of the term of this patent subsequent to Apr. 3, 1996, has been disclaimed.

[21] Appl. No.: 17,360

[22] Filed: Mar. 5, 1979

Related U.S. Application Data

[63] Continuation-in-part of Ser. No. 828,425, Aug. 29, 1977, Pat. No. 4,148,078, which is a continuation of Ser. No. 681,759, Apr. 20, 1976, abandoned, which is a continuation of Ser. No. 459,071, Apr. 8, 1974, abandoned.

[51] Int. Cl.$^3$ .............................................. G11B 5/04
[52] U.S. Cl. ............................................... 360/30
[58] Field of Search .................... 360/27, 28, 29, 30

[56] References Cited

U.S. PATENT DOCUMENTS

| | | | |
|---|---|---|---|
| 2,713,677 | 7/1955 | Scott et al. | 360/28 |
| 2,807,797 | 9/1957 | Shoemaker | 360/28 |
| 3,181,133 | 4/1965 | Seitner | 360/28 |
| 3,488,452 | 1/1970 | Gunning et al. | 360/28 |

Primary Examiner—Vincent P. Canney
Attorney, Agent, or Firm—Bruce D. Sunstein

[57] ABSTRACT

An apparatus for producing a signal which varies as the ratio of the frequency of a first stream to a second stream. In a preferred embodiment of the apparatus, the first stream is transformed into a first signal of value proportional to the frequency of the first stream, and the second stream is transformed into a second signal that has a value proportional to the product of the second stream frequency times a feedback value. The feedback value is derived from a combination of the first and second signals.

5 Claims, 12 Drawing Figures

FREQUENCY-RATIO APPARATUS

This is a continuation in part of my application Ser. No. 828,425, filed Aug. 29, 1977, now issued as U.S. Pat. No. 4,148,078, which in turn is a continuation of Ser. No. 681,759, filed Apr. 20, 1976 and now abandoned, which is a continuation of application Ser. No. 459,071 filed Apr. 8, 1974, now abandoned.

THEORY OF THE INVENTION

Data transmission of recording using a frequency-modulated carrier is accomplished by deviating the carrier frequency in response to the amplitude of a data signal, and by transmitting or recording this modulated carrier frequency. In a typical FM system, the magnitude and polarity of the data signal determine, respectively, the amount and direction of the frequency deviation of the carrier. A "dc" (non-time varying) signal, depending on its polarity, either increases or decreases the carrier frequency, while an "ac" (time varying) signal alternately increases and decreases the carrier above and below its "center", or unmodulated, frequency at a rate equal to that of the data frequency. In the typical ("linear") FM system, where $f_c$ = the unmodulated carrier frequency, and
$f_D$ = the carrier frequency modulated by the data, the amplitude of the data signal is expressed by the relative frequency deviation of the carrier. The instantaneous value of the data, $A_D$, is given by $$A_D = K(f_D - f_c)/f_c \qquad (1)$$

K = a constant where the ratio $K/f_c$ is the scaling factor for the channel, i.e., in a system where $K/f_c$ = +0.01 Volt/Hz, a positive 100 Hz deviation of the carrier would be equivalent to a data signal of +1 volt.

$$(+0.01 \text{ V/Hz} \times (f_c + 100 - f_c) \text{ Hz} = +1.0 \text{ Volt})$$

Because the data information is imparted to the carrier by deviating the carrier frequency, the demodulation (data recovery) process must determine, from whatever deviations are present in the carrier, the original form of the data signal. Any external factors which are capable of altering the transmitted and/or received frequencies, hence, will be demodulated and exist as undesirable, erroneous "noise" components in the demodulated data signal. If these noise-inducing factors are not precisely known, then the exact value of the original data signal can never be determined.

For this reason, many FM systems employ a reference frequency, a known frequency which is transmitted or recorded simultaneously with the data-modulated carrier frequency. It may be assumed that whatever system perturbations have caused variations in this reference frequency from its known value will also have caused instantaneous related variations in the data-carrier frequency. By accurately knowing how the reference frequency has been affected, one can theoretically, with sufficient knowledge of how these known influences on the reference signal would have affected the data-modulated carrier, in effect go "backwards" and reconstruct the true value of the original data signal. Let $f_R$ = the transmitted reference frequency
$f_D$ = the transmitted carrier frequency modulated by the data signal
$f_R'$ = the received reference frequency (system perturbations have changed $f_R$ so that $f_R'$ no longer equals $f_R$)
$f_D'$ = the received data-modulated carrier frequency (the same perturbations have also changed $f_D$, in the transmission process so that $f_D' \neq f_D$)

Let $$E_R = f_R' - f_R/f_R, \qquad (2)$$

PS the known transmission error experienced by the reference channel, and let $$E_D = f_D' - f_D/f_D, \qquad (3)$$

the (unknown) transmission error experienced by the data channel

With sufficient knowledge of the overall system, one can define a term S which expresses the instantaneous relationship between the transmission error in the data channel, $E_D$, to the error in the reference channel, $E_R$, i.e., let $$S = E_D/E_R \qquad (4)$$

If one knows both S and $E_R$, $E_D$ can now be found by $$E_D = S \times E_R \qquad (5)$$

Replacing the now known value for $E_D$ into equation (3) results in $$f_D = f_D'/1 + E_D = \text{the frequency of the data carrier with the transmission error removed.} \qquad (6)$$

The true frequency deviation and, hence, the true value of the original data signal can now be found by demodulating $f_D$.

The overall expression for the amplitude of the data, $A_D$, as a function of the received data and reference frequencies and the system function S can be found by combining the expressions for S and $E_R$ with equation (1) or $$A_D = K \left[ \frac{\dfrac{f_D'}{1 + S\left[\dfrac{f_R' - f_R}{f_R}\right]} - f_c}{f_c} \right] \qquad (7)$$

In any real FM data-transmission system, it is never possible to determine exactly the value of the original data signal. Digital systems are limited in accuracy by non-infinite word length which results in quantizing error, the uncertainty resulting from the finite size of the smallest incremental change which the system can express. Analog systems are limited by residual noise which generates output signals even when no input signal is present. Because the presence of noise limits the accuracy of an information system, it has become common practice to express the accuracy of a system as a ratio of the maximum amplitude of a transmitted signal to the amplitude of the system noise. The signal to noise ratio, or S/N, is usually expressed in decibels, or db.

$$S/N\,(db) = 20\,\log_{10}\frac{\text{Amplitude of max signal}}{\text{Amplitude of noise}}$$

Thus, a S/N of 40 db would indicate a 100:1 ratio, or a system uncertainty of one percent of the value of a maximum amplitude signal. When the noise is not uniform, but varies with the amplitude of the recorded signal, then a S/N figure would include this "gain" noise or "percent of signal amplitude" noise as a separate, specified term. Because of the often complex waveforms associated with noise signals, care must be taken in interpreting S/N figures regarding the units of noise measurement, bandwidths involved, and other related variables.

The frequency modulation technique is usually selected for its ability to transmit "dc" information, and for such a system's relative insensitivity to amplitude variations in the transmitted and received carrier waveforms. But because the information is contained in the frequency rather than the amplitude of the modulated carrier, an FM system is extremely sensitive to unwanted frequency variations. In a magnetic tape recording/playback system, flutter (unwanted variations in tape speed) is unavoidable, both during recording and playback. These velocity variations in the tape speed frequency modulate the already modulated carrier. The effect of flutter on the FM carrier is instantaneous multiplication of the recorded frequency by the instantaneous value of the cumulative record/playback tape velocity, which equals $(1+F)$ where F is the cumulative instantaneous record/playback flutter, or velocity error. Thus F becomes a mathematical factor common to all signals simultaneously exposed to the speed variation. A +1 percent flutter (i.e., $F=+0.01$) would cause a 3 KHz carrier to appear as 3030 Hz, a 5 KHz carrier as 5050 Hz, etc. Errors such as these in the time-base (absolute frequency) accuracy of the data can be eliminated only through use of a buffer system, where data is input at a rate modulated by the system flutter, but output at a corrected rate determined by the original sampling rate or some other reference rate. Fortunately, these flutter-generated time-base errors are usually insignificant compared to the corresponding flutter-generated amplitude errors in an FM recording system (as evident in FIGS. 10, 11, 12). All references to "noise" will refer, as is customary, to amplitude error rather than to time-base error, unless otherwise indicated.

If one lets

F = the cumulative (for both recording and playback) instantaneous flutter, or speed error, in the velocity of the magnetic tape, $f_c$ = the frequency of the unmodulated data carrier, m = the amount of modulation of the carrier due to the data signal, i.e., $m = \pm 0.5$ for $\pm 50$ percent modulation), then in a typical ("linear") FM system $f_D = f_c(1+m)$ = the frequency of the recorded, data-modulated carrier, and (8)

$f_D' = f_c(1+m)(1+F)$ = the instantaneous frequency of the same signal, $f_c(1+m)$, upon playback, with an instantaneous cumulative flutter of value F. (9)

If the reference carrier, which by definition has a known modulation (usually zero), has been recorded simultaneously with the data carrier, then if $f_R$ = the frequency of the recorded reference carrier, then $f_R' = f_R(1+F)$ = the instantaneous frequency of the reference carrier, $f_R$, upon playback, with an instantaneous cumulative flutter equal to F. (10)

Equation (9) demonstrates the non-uniform effect of the flutter, in that the frequency error caused by the flutter is multiplied by $(1+m)$, or by the data modulation itself. Thus a one percent flutter will cause a one percent change in the carrier only when $m=0$, or when no data is present. In a system where the modulation is symmetrical about the carrier frequency, the absolute value of m must be less than one to prevent the carrier frequency from going to zero at $m=-1$, so that the effect of the flutter is nearly doubled as m approaches $+1$, and approaches 0 as m approaches $-1$.

In the most widely used method for reducing flutter noise in FM recordings a reference carrier with no modulation is recorded simultaneously with the data-modulated carrier, either on the same channel (or track), or on a separate channel. Each channel is demodulated via a limiter (to lessen the effects of amplitude modulation), an FM discriminator such as a phase-locked loop, or the more common constant-energy pulse generator (a monostable multivibrator), and a low-pass filter. The output of the reference channel is then subtracted from the output of the data channel. As previously stated, in a typical FM system the output signal or voltage is linearly proportional to the deviation of the carrier, i.e., $$V_{out} = R\left[\frac{f_D - f_c}{f_c}\right]$$

Substituting the expression for the played-back frequency of the data channel (equation 9) for $f_D$ in the above equation, and letting $K=1$ for the sake of simplicity, yields $$V_{out}[\text{Data Channel}] = \frac{f_c(1+m)(1+F) - f_c}{f_c} \quad (11)$$
$$= (1+m)(1+F) - 1$$
$$= 1 + m + F + mF - 1$$
$$= m + F(1+m)$$

Substituting in like manner the expression for the reference channel playback frequency (equation 10) results in $$V_{out}[\text{Ref. Channel}] = \frac{f_R(1+F) - f_R}{f_R} \quad (12)$$
$$= 1 + F - 1 = F$$

Subtracting the output of the reference channel from that of the data channel indicates that $$V_{out}[\text{Data Channel} - \text{Ref. Channel}] = (m + F + mF) - (F) \quad (13)$$
$$= m[\text{data}] + mF[\text{noise}]$$

or that the output signal consists of the desired data term, m, and a data-modulated flutter-generated term, mF.

It is immediately apparent that this flutter correction method is far from perfect, in that a noise term is present except when m=0, i.e., the effect of the flutter is only removed when there is no data being recorded.

Equation 11 shows that without a reference channel, the ratio of noise to maximum signal output for the data channel would be $$N/S_{max}[\text{Data Channel}] = F(1+m)/m_{max} \quad (4)$$

Because practical considerations limit the allowable modulation to less than 100 percent (i.e., $m_{max}$ must be less than 1), equation 14 expresses the "flutter multiplication" effect on S/N, in that a certain percentage of flutter will result in a greater percentage of noise relative to the maximum possible signal.

For a modulation equivalent to ±Full Scale of ±50 percent, the corresponding $N/S_{max}$ figures would be

|  | m | $N/S_{max}$ |
|---|---|---|
| "Positive Full Scale" | +.5 | F(1.5/.5) = 3F |
| "Baseline" | 0 | F(1/.5) = 2F |
| "Negative Full Scale" | −.5 | F(.5/.5) = 1F | i.e., the effect of the flutter is doubled at m=0, tripled at +Full Scale, and in a one-to-one ratio at −Full Scale.

Because subtracting the output of the reference channel results in an output expressed by m+mF, the noise to signal ratio is improved, and expressed by $$N/S_{max}[\text{Data Channel} - \text{Ref. Channel}] = mF/m_{max} \quad (15)$$

The corresponding N/S figures for the same ±50 percent modulation are

| m | $N/S_{max}$ |
|---|---|
| +.5 | F |
| 0 | 0 |
| −.5 | −F |

It is apparent that this technique for flutter compensation is only effective for small amplitude signals (m near 0), and that the effect of the flutter is still 100 percent for signals of maximum amplitude.

The preceeding calculations express, of course, theoretical performance. In a real system using this technique there will always be some flutter noise present even when no signal is present (m=0), primarily because of slight variations in the gain and phase responses of the two low-pass filters necessary for the demodulation of the two channels.

It follows from my preceding expressions for the frequency outputs of the data and reference channels that to perform perfect compensation (i.e., remove all flutter-generated noise for any modulation value), a theoretically perfect demodulator would have to perform division of the data channel playback frequency by the reference channel playback frequency, i.e., $$\frac{f[\text{Data channel}]}{f[\text{Ref. channel}]} = \frac{f_c(1+m)(1+F)}{f_R(1+F)} \quad (15)$$

$$= 1 + m \text{ when } f_c = f_R$$

which results in a constant (1) and the desired data signal (m). Subtracting the constant leaves only the data signal with all amplitude noise caused by the flutter completely eliminated.

One possible system to accomplish this involves an analog divider circuit. However, highly accurate and stable division is a relatively difficult function to perform with analog circuitry. Devices which are currently available to perform such functions are not only expensive, but fall short of the ideal device in their operation, being prone to such phenomena as temperature instability, "dc" drift, non-linearity, limited frequency response, and internally generated noise.

Another possible system attempts flutter removal utilizing computer-based digital techniques. The system measures the frequencies of the reference and data channels and stores this information in the computer, where the mathematical process of division is performed upon the frequencies, resulting in the "true" value for $f_D$ which can then be mathematically demodulated to yield the information transmitted. Besides requiring a computer and associated peripheral equipment, the overall result falls short of the theoretical values, due primarily to the fact that:

a. the measurement of frequency requires sampling over a time interval. The more accurate the desired measurement, the longer must be the time over which the sample is taken. Because the frequencies are usually changing during the sampling period, the figures which are later operated upon may not be of sufficient accuracy, and b. overall accuracy is limited by the finite word length used in the calculations.

Another possibility is a system where the input data signal is digitalized via an analog-to-digital converter, the resulting samples being recorded in digital form. The playback process then consists of passing each sample through a digital-to-analog converter to reconstruct the original data signal. The only effect of flutter in such a system is inaccuracy in the time base in the reproduced data, i.e., no amplitude noise is added to the output signal by the flutter. The system is limited in accuracy only by the number of bits used in the digitizing process. The sampling rate must be at least twice the frequency of the highest data frequency, and requires a fairly sophisticated digital recorder, as well as the required analog-to-digital and digital-to-analog converters. Such a system would be inherently quite expensive and would very likely require higher bandwidth capabilities in the recording process than would a comparable FM system. Although such a system would be many times more expensive than a similar FM system, its improved performance over currently existing FM systems would justify the expense in many situations requiring a low-noise, high-performance recorder. These and other difficulties have been obviated in a novel manner by the present invention.

It is, therefore, an outstanding object of the invention to provide a noise-reduction system for removing flutter noise from a tape-recorded frequency-modulated data stream.

Another object of this invention is the provision of a noise-reduction system for allowing reproduction of frequency-modulated data read from an inexpensive audio cassette tape recorder with peak-to-peak signal-to-noise ratio of better than 60 db over a flat bandwidth of from 0 to 100 Hz.

A further object of the present invention is the provision of a noise-reduction system which is inexpensive to manufacture, which is compact, and which is capable of a long life of useful service with a minimum of maintenance.

A further object of the present invention is to provide an apparatus for producing a signal which varies as the ratio of the frequency of a first stream to a second stream.

With these and other objects in view, as will be apparent to those skilled in the art, the invention resides in the combination of parts set forth in the specification and covered by the claims appended hereto.

SUMMARY OF THE INVENTION

The invention involves an apparatus for producing a signal which varies as the ratio fo the frequency of a first stream to a second stream. In a preferred embodiment of the apparatus, the first stream is transformed into a first signal of value proportional to the frequency of the first stream, and the second stream is transformed into a second signal that has a value proportional to the product of the second stream frequency times a feedback value. The feedback value is derived from a combination of the first and second signals.

One of the important uses of the apparatus is in connection with frequency modulation tape recording systems. In such a use, the first stream is a frequency modulated data stream having undesirable flutter-induced noise, and the second stream is a reference stream having a predetermined frequency that has been subject to essentially the same noise. Such use is covered by my U.S. Pat. No. 4,148,078.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
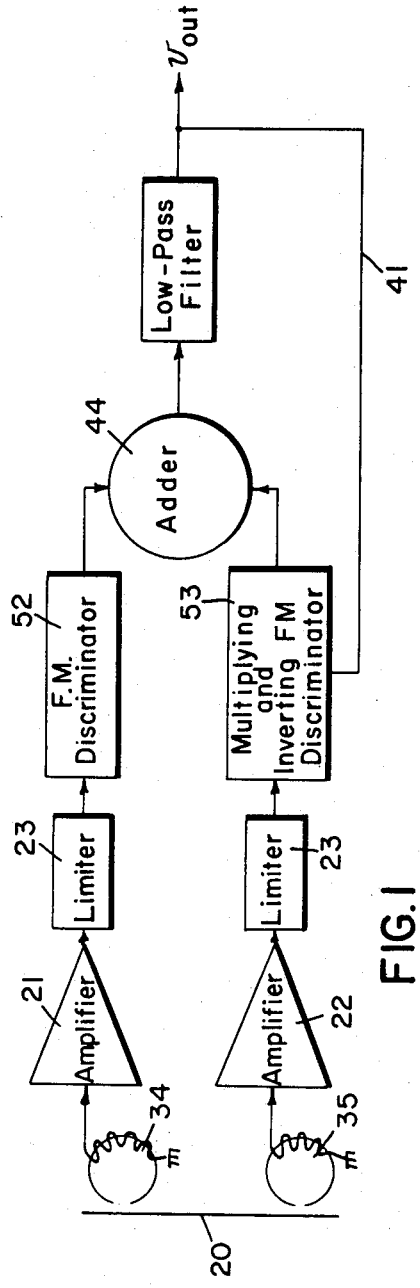
FIG. 1 is a simplified block diagram of a noise-reduction system embodying the principles of the present invention.

The following invention pertains to a method of electronically processing two frequency-modulated signals, namely (1) a frequency-modulated data signal, and (2) a corresponding reference signal; in such a manner as to essentially remove all amplitude noise from the demodulated output data signal, in particular from, but not limited to, a data and reference signal which have been recorded simultaneously on magnetic tape, and which in both the recording and playback process are subject to the multitude of frequency perturbations which are inherently generated in the process of trying to mechanically move a magnetic tape at a constant velocity past a recording or playback head.

The invention is in essence an extremely accurate and simple analog computer which calculates from the two frequency inputs the true value of the original recorded data signal.

As previously stated, the effect of flutter (unwanted variations in tape speed) on a recorded frequency is instantaneous multiplication of the recorded frequency by the instantaneous value of the cumulative record-playback tape velocity, which equals $(1+F)$ where F is the cumulative instantaneous record-playback flutter, or accumulated velocity error, and exists as a mathematical factor common to every signal which is simultaneously exposed to the noise generating operation.

Where
$f_c$ = the frequency of the unmodulated data carrier, and
$m = f - f_c/f_c$ = the amount of modulation imparted to the data carrier frequency by the data signal (i.e., $m = \pm 0.5$ for $\pm 50$ percent modulation)

then in a typical FM information transmission system
$f_D = f_c(1+m)$ = the frequency of the recorded, data-modulated carrier frequency If one lets
F = the cumulative instantaneous flutter, or speed error, in the velocity of the magnetic tape then
$1+F$ = the effective playback velocity of the magnetic tape and, therefore,
$f_D' = f_c(1+m)(1+F_D)$ = the instantaneous frequency of the recorded signal, $f_c(1+m)$, upon playback, with an instantaneous cumulative data channel flutter equal to $F_D$.

In similar fashion, where
$f_R$ = the frequency of the unmodulated recorded reference carrier then
$f_R' = f_R(1+F_R)$ = the instantaneous frequency of the reference carrier, $f_R$, upon playback, with an instantaneous cumulative reference channel flutter equal to $F_R$.

Due to the fact that the data-modulated carrier and the reference carrier are simultaneously recorded onto (and played back from) the same magnetic tape, tape speed variations during the record or playback process are essentially identical for each channel at any instant in time. Although such factors as dynamic skewing and non-uniform dynamic stretching of the tape can result in slightly different instantaneous flutter values between two different tracks on the tape, these mechanical effects are relatively minute and the analysis will make the excellent assumption that the F values in the expressions for the playback frequencies are the same, i.e., that $F_D = F_R = F$.

Because the effect of flutter is "common-mode multiplication" of the two frequencies (i.e., each frequency by the same amount), the circuitry of the invention rejects as data any frequency modulation which has a common multiplier between the data and reference channels, since such frequency modulation could only have been the result of flutter. This algorithm is performed by multiplying the reference channel playback signal by (1+m) utilizing a feedback circuit configuration, and by subtracting the resulting value from the data channel signal. Mathematically, the simplified expression for the overall operation performed is $$\frac{f_c(1 + m)(1 + F) - f_c}{f_c} - \qquad (23)$$

$$\left[\frac{f_R(1 + F) - f_R}{f_R}\right](1 + m) = m$$

where the m in the (1+m) term is provided by feeding back the output to the reference channel discriminator, where the necessary multiplication by (1+m) is performed.

Figure 2:
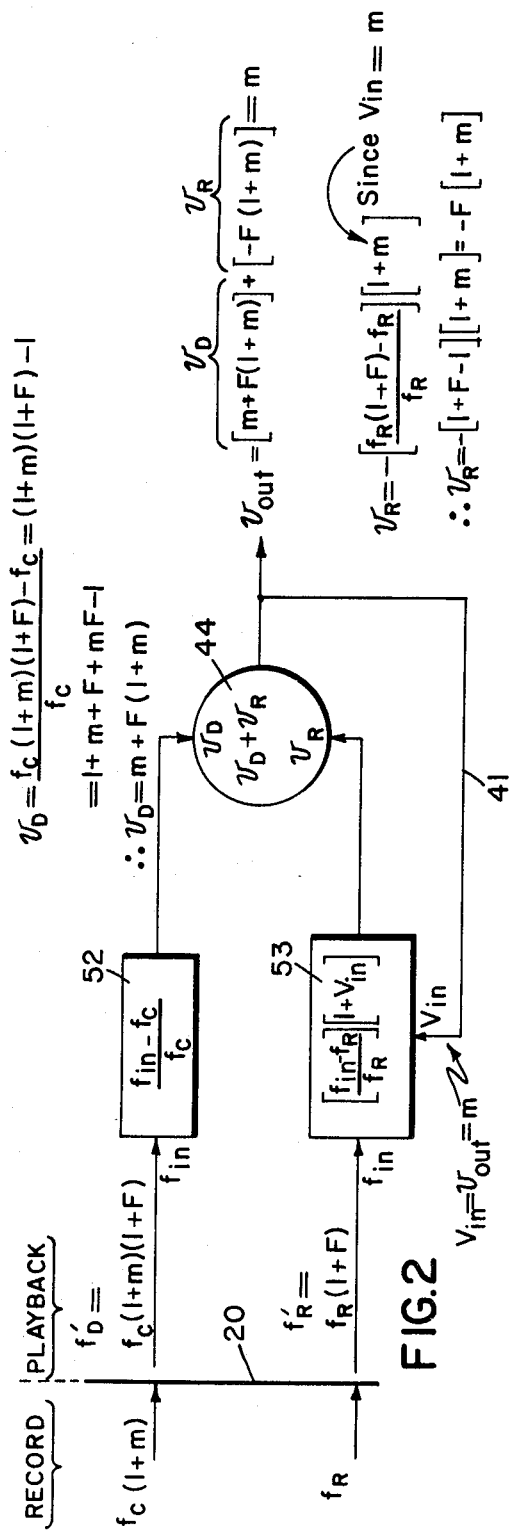
FIG. 2 is a mathematical analogy of the system shown in FIG. 1.

FIG. 1 is a simplified block diagram of the invention, which shows the basic signal flow and, more importantly, FIG. 2 shows the analogous mathematical model which demonstrates the feedback technique whereby the output signal is used to generate itself.

As will be shown below, there are no low-pass filters between the FM discriminators and the summation circuit. The summation of the data channel signal with the inverted flutter channel signal is, therefore, performed essentially instantaneously as the frequencies come off the tape, by summing the voltage pulses representing the values of each channel without either signal having to first pass through a low-pass filter. This predemodulation pulse summation eliminates the gain, phase, offset, temperature coefficient, and transient-response differences inherent between two low-pass filters, and renders the flutter noise cancellation virtually perfect. The invention in fact eliminates complete demodulation of the reference channel, in that no low-pass filter is required for the reference channel but only a single pulse-generating discriminator which can supply any number of data channels with the proper reference channel signal. The overall system characteristic is one of translating the accuracy of the flutter removal from the flutter frequency domain to the data frequency domain; i.e., with this system the removal of the flutter noise is essentially independent of the flutter frequency.

Figure 3:
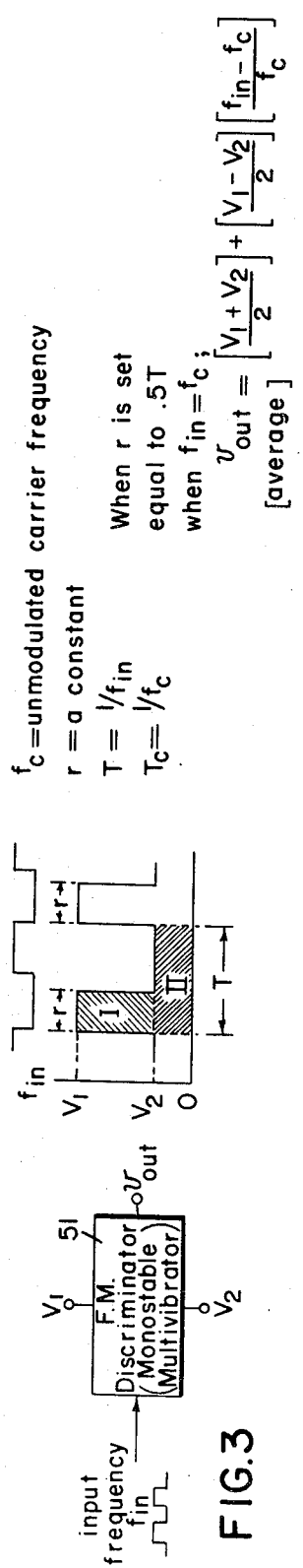
FIG. 3 is a diagrammatic representation of a general FM discriminator used in the present invention.
Figure 4:
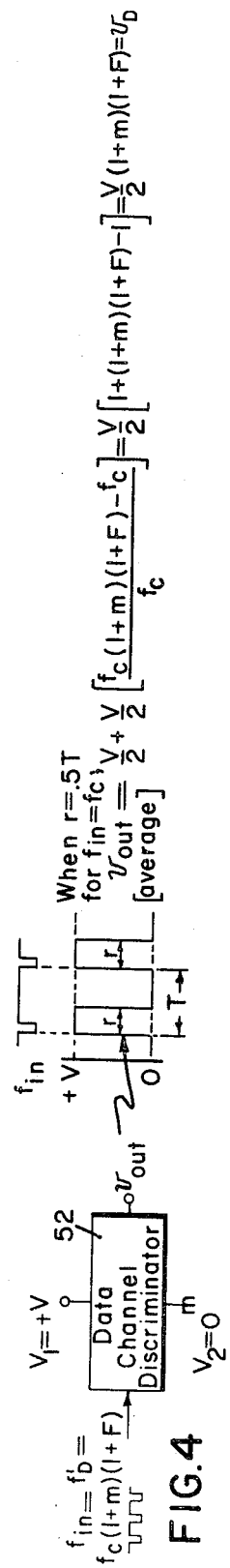
FIG. 4 is a diagrammatic representation of a data channel discriminator used in the present invention.
Figure 5:
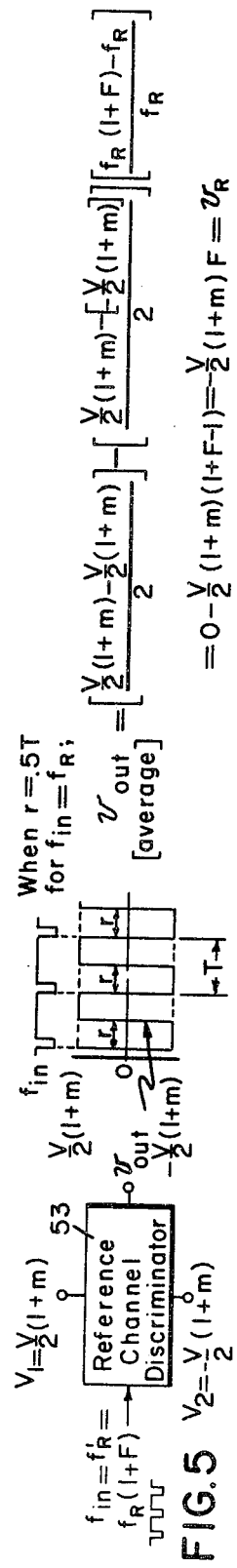
FIG. 5 is a diagrammatic representation of a reference channel discriminator used in the present invention.

A figurative representation of the FM discrimination section of the present invention is shown in FIG. 3 (in general), FIG. 4 (specifically for data channel) and FIG. 5 (specifically for reference channel). The data channel uses the simple but very accurate constant-energy-pulse generator (known as a monostable multivibrator) as the FM discriminator. This device produces a rectangular pulse of constant amplitude (V) and constant width (r) for every cycle of the input frequency signal. The average or "dc" value of such a series of pulses is given by (see FIG. 3)

$$V_{average} = \frac{1}{T} \int_0^T f(t) \, dt = \frac{Vr}{T} = Vrf_{in} \qquad (24)$$

where $f(t) = V$ for $t = 0$ to $r$, and 0 for $t = r$ to $T$, and where $T = 1/\text{input frequency}$. Usually r is set such that when the input frequency equals $f_c$ (i.e., no modulation is present), $r = 0.5\, T$ and the waveform has a 50 percent duty cycle so that $V_{average} = V0.5T/T = V/2$. Variations in the input frequency change T and, therefore, the average value. As the frequency approaches 0, the pulses become so widely spaced that $V_{average}$ approaches 0, and as the frequency approaches 2 $f_c$ the spacing decreases and $V_{average}$ approaches V. Thus the relative change in $V_{average}$ is directly proportional to the frequency deviation of the input signal from $f_c$. The overall effect of a changing input frequency on the average value is that the average value is equal to the mid peak-to-peak voltage plus half the peak-to-peak amplitude times the ratio of the frequency deviation to the center frequency or, $$V_{average} = \frac{V_1 + V_2}{2} + \left[\frac{V_1 - V_2}{2}\right]\left[\frac{f_{in} - f_c}{f_c}\right] \qquad (25)$$

when $r = 0.5\, T$ for $f_{in} = f_c$

This is because the integral in the expression for the average value (Equation 24) is equal to the area under the waveform from 0 to T, and may be easily determined as equal to the sum of the shaded areas I and II indicated in FIG. 3. Since the area of I equals $(V_1 - V_2)r$ and that of II equals $V_2T$, then $$V_{average} = \frac{1}{T}\int_0^T f(t)\, dt = \frac{1}{T}[\text{area I} + \text{area II}] \qquad (26)$$

$$= \frac{1}{T}[V_2 T + (V_1 - V_2)r] = V_2 + \frac{(V_1 - V_2)r}{T}$$

This may also be expressed as $$V_{average} = V_2 + \frac{(V_1 - V_2)r}{T_c}\,\frac{T_c}{T} \qquad (27)$$

Because we know from the defined terms that $$\frac{T_c}{T} = \frac{1/f_c}{1/f_{in}} = \frac{f_{in}}{f_c}$$

equation 27 may be expressed as $$V_{average} = V_2 + \frac{(V_1 - V_2)r}{T_c}\,\frac{f_{in}}{f_c} \qquad (28)$$

This may be correctly rewritten as $$V_{average} = V_2 + \frac{(V_1 - V_2)r}{T_c}\left[\frac{f_{in}}{f_c} - 1\right] + \frac{(V_1 - V_2)r}{T_c} \qquad (29)$$

Combining and simplifying terms, then $$V_{average} = \qquad (30)$$

$$V_2 - \frac{V_2 r}{T_c} + \frac{V_1 r}{T_c} + \left[\frac{r}{T_c}(V_1 - V_2)\right]\left[\frac{f_{in} - f_c}{f_c}\right]$$

If we set r equal to 0.5 $T_c$ in equation 30, the expression further simplifies to that indicated in FIG. 3, namely $$V_{average} = V_2 - \frac{V_2}{2} + \frac{V_1}{2} + \left[\frac{V_1 - V_2}{2}\right]\left[\frac{f_{in} - f_c}{f_c}\right] \quad (31)$$

$$= \frac{V_1 + V_2}{2} + \left[\frac{V_1 - V_2}{2}\right]\left[\frac{f_{in} - f_c}{f_c}\right]$$

For the data channel, $V_2=0$ and $f_{in}$ equals $f_c(1+m)$ $(1+F)$ when flutter is present, so that $$V_D = V_{average} \atop \text{[Data Channel]} = \frac{V}{2} + \frac{V}{2}\left[\frac{f_c(1+m)(1+F) - f_c}{f_c}\right] \quad (32)$$

$$= \frac{V}{2}[1 + (1+m)(1+F) - 1]$$

$$= \frac{V}{2}(1+m)(1+F)$$

Thus, the amplitude of the pulses is multiplied by the factor which causes spacing deviations in the output pulses (i.e., the input frequency); thus it might prove feasible to perform effective multiplication of a frequency by using the amplitude of the pulse train as one of the terms to be multiplied. This is precisely how the FM discriminator in the reference channel performs the multiplication indicated in the system block diagram. In the reference discriminator, $V_1$ is the feedback voltage from the output before the offset voltage is removed, namely $V/2(1+m)$, and $V_2$ is this same voltage inverted, or $V_2 = -V/2(1+m)$. The r-width pulses are inverted to change the sign of the output signal so that the addition performed is in reality subtraction.

In like manner, therefore, $$V_R = V_{average} = -\Bigg\{\frac{(V/2)(1+m) - (V/2)(1+m)}{2} \quad (33)$$

$$+ \left[\frac{(V/2)(1+m) - [(-V/2)(1+m)]}{2}\right]$$

$$\left[\frac{f_R(1+F) - f_R}{f_R}\right]\Bigg\}$$

$$= 0 - (V/2)(1+m)(1+F-1)$$

$$= -(V/2)(1+m)F$$

which is a signal proportional to the tape flutter multiplied by the data modulation.

Figure 6:
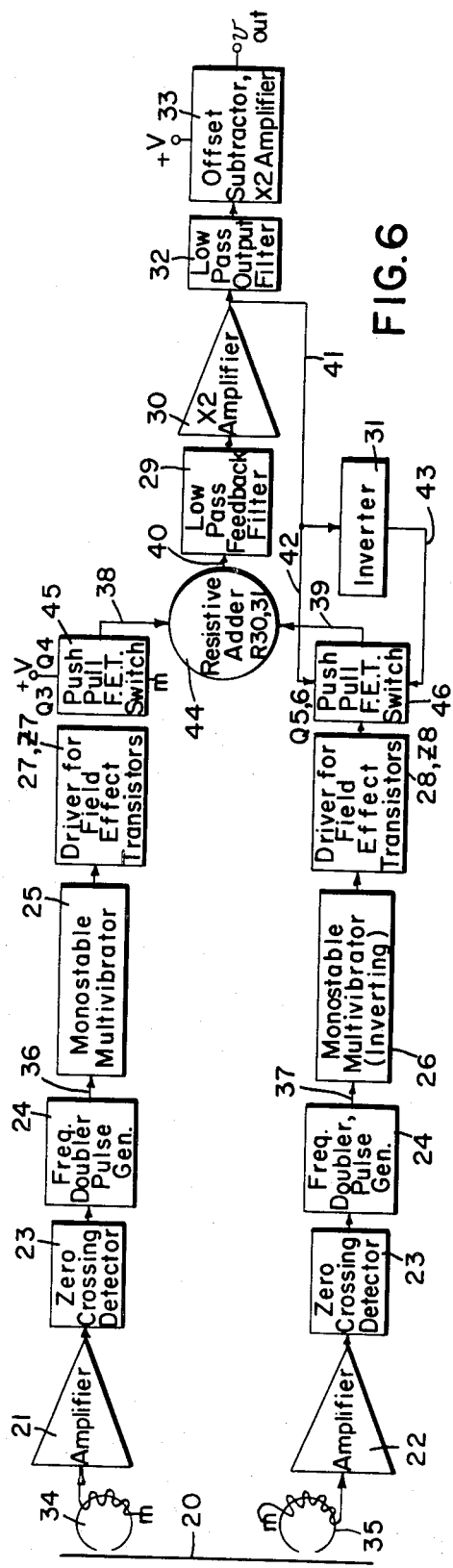
FIG. 6 is a detailed block diagram of a noise-reduction system embodying the principles of the present invention.
Figure 7:
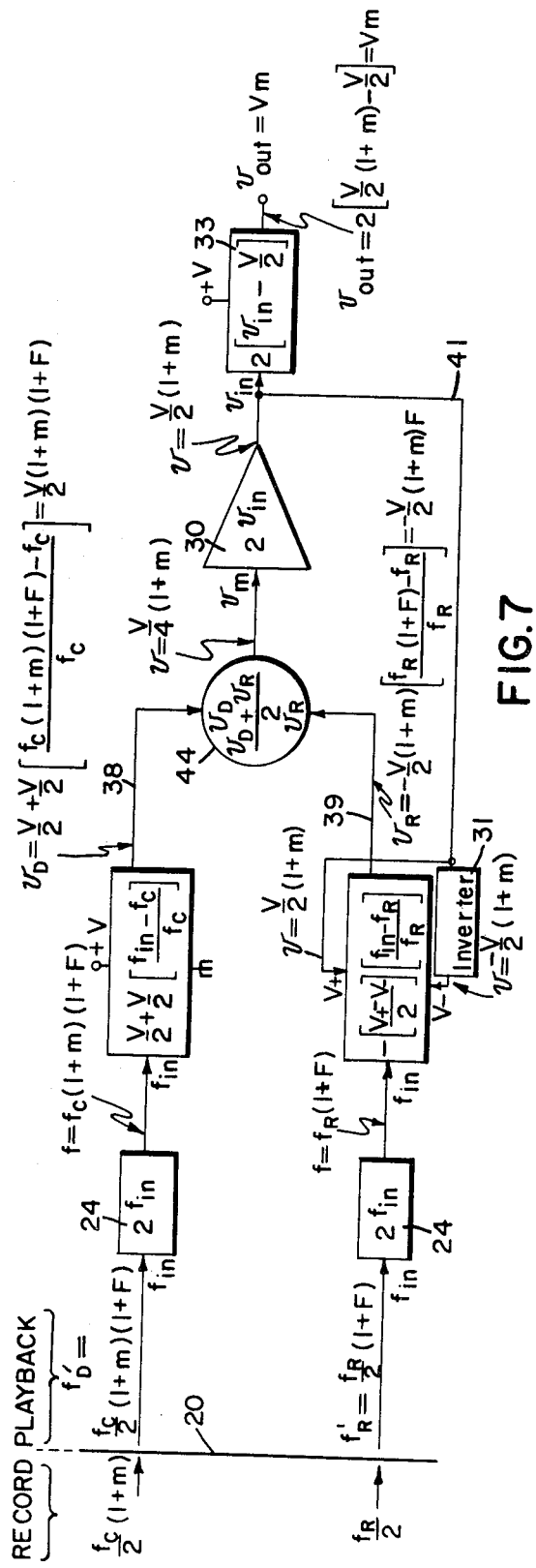
FIG. 7 is a mathematical analogy of the system of FIG. 6.

FIG. 6 is a detailed block diagram of the invention and FIG. 7 is the mathematical equivalent of the operations performed by the circuitry. The data and reference frequencies are divided by 2, recorded, and then doubled upon playback to both conserve tape bandwidth and gain an octave of frequency separation for simpler output filtering. The resistive adder 44 attenuates the signals by a factor of 2 and is, therefore, followed by a gain-of-2 amplifier 30, which is adjustable over a small range and is used to set the flutter noise precisely to zero. The "dc" offset of amplitude V/2 is not removed until the output stage because it is circulated through the feedback network to provide the proper switching bias voltage level for the bipolar reference channel switch 46. The entire demodulation system uses only a single positive voltage reference denoted at +V (+V equals +5 vdc in the actual circuitry) to generate a bipolar output of ±2.5 volts for ±50 percent modulation. Changes which might occur in the +5 v reference have no effect on the output offset voltage and no effect on the accuracy of the flutter-noise removal. The only effect is on the gain since the output signal is Vm.

Figure 8:
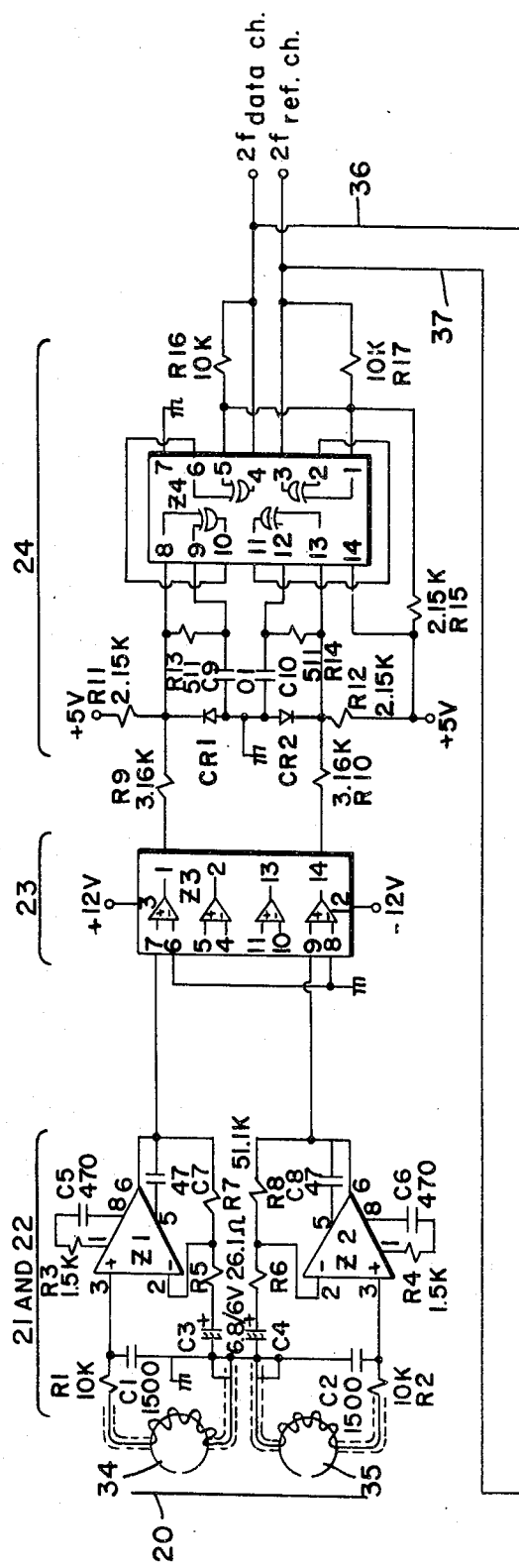
FIG. 8 is a portion of a schematic diagram of the noise-reduction system of the present invention, the diagram being connected to FIG. 9 at leads 37 and 38.
Figure 8:
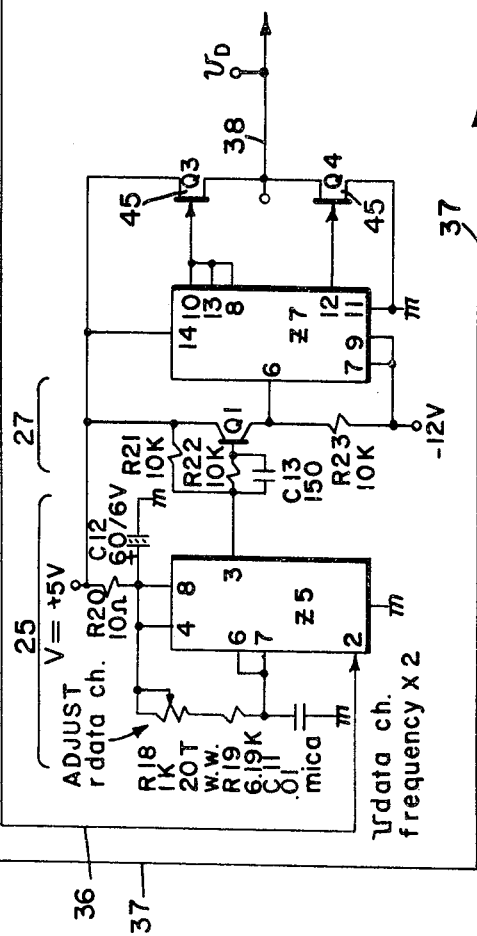
Figure 9:
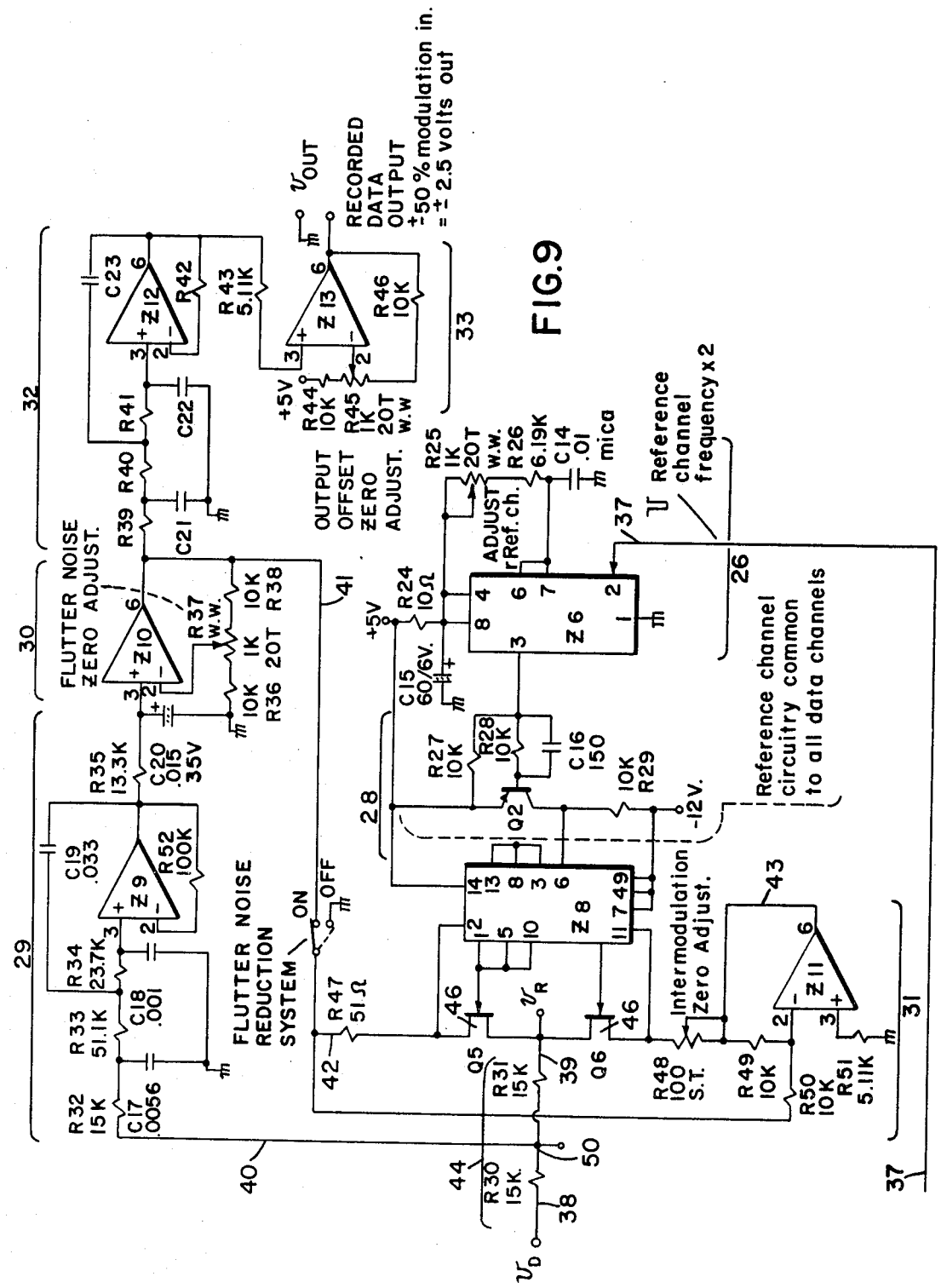
FIG. 9 is the remainder of the schematic diagram of FIG. 8.

A schematic diagram of the invention is shown in FIGS. 8 and 9. Each heavy square or triangle represents a tiny integrated circuit. In the diagram, all of the triangular operational amplifiers have +12 volts connected to their number 7 pin and −12 volts connected to their number 4 pin. Q4, Q5, Q6 and Q7 represent 50 ohm "N" channel field-effect transistors. All resistors are one percent, ⅛ watt, metal film unless specified. Z1 and Z2 represent Fairchild μA709C operational amplifiers, Z3 is a National Semiconductor Corp. LM339 Quad Comparator, Z4 is a SN74L86 Quad Exclusive-Or Gate, and Z5 and Z6 are Signetics 555T Timers. Z7 and Z8 are RCA 4007 cos/mos "Dual Complementary Pair Plus Inverter", and Z9, Z10, Z11, Z12 and Z13 are LM307 Type operational amplifiers. 20 T and S.T. mean "20 turns" and "single turn" respectively, and w.w. means wirewound. The frequency signals for each channel are recovered from the moving magnetic tape 20 by the data channel playback head 34 and reference channel playback head 35 (both physically in the same "playback head") at the millivolt level and are boosted by a gain of approximately 2000 in the playback amplifiers 21 and 22 over a 3 db bandwidth of from 900 Hz to 5000 Hz. The center frequency $f_c$ of the data channel was arbitrarily chosen at 3000 Hz, with a maximum data-modulated deviation of ±1500 Hz (±50 percent). The recorded reference frequency can also be 3000 Hz, or it may be varied from this value since it isn't modulated. The sinewave outputs of the playback amplifiers are fed into Z3, and "LM339 Quad Comparator", a device which contains four high-gain open-loop amplifiers which serve as zero-crossing detectors 23 (two are left over and can be utilized for two more data channels). Each of the two square-wave outputs from Z3 (one at the data frequency, one at the reference frequency) drives the frequency doubler and pulse generator 24 including Z4, a Transistor-Transistor-Logic (T²L) "Quad Exclusive-Or" circuit, each input driving a gate with a resistor-capacitor network on the input which causes each gate to output a single positive pulse for each transition of the square-wave input. This doubles the frequency of each channel, with the pulses approximately 5 microseconds wide. These narrow pulses are inverted by the remaining 2 gates in Z4 to provide the proper negative-pulse input trigger signals for the monostable multivibrators 25 and 26, Z5 and Z6. These are Signetics Model NE555 Timers which produce a single-positive output pulse (of adjustable width) for each trigger pulse. Each output is then level-shifted and inverted through a high-speed transistor switch 27 and 28 (Q1 and Q2) to provide the optimum input signal for Z7 and Z8, each of which is an RCA CMOS "Dual Complementary Pair plus Inverter". These devices are normally used for digital logic applications, but they are utilized in this invention to 1. provide the optimum voltages to drive the gates of the field-effect-transistors (F.E.T.'s) in the pulsesummation circuit, and 2. to provide the inversion required so that only a single F.E.T. in a pair is on at any one time—i.e., to drive them out of phase with each other.

Z7 drives the gate of Q3 between $-12$ vdc (Q3 "off") and $+5$ vdc (Q3 "on") and the gate of Q4 between zero volts (Q4 "on") and $-12$ vdc (Q4 "off"). Z8 drives the gate of Q5 between the feedback voltage $(V/2)(1+m)$ (Q5 "on") and $-12$ vdc (Q5 "off"), and the gate of Q6 between $(-V/2)(1+m)$ (Q6 "on") and $-12$ vdc (Q6 "off").

The net result of this switching is that $V_D$ is an extremely accurate square wave driven between $+5$ vdc (Q3 on, Q4 off) and zero volts (Q3 off, Q4 on), with rise and fall times on the order of 100 nanoseconds, and with a pulsewidth determined by the data channel monostable multivibrator 25. As demonstrated previously, the "dc" value of $V_D$ is $(V/2)(1+m)(1+F)$. The reference output voltage $V_R$ is also an extremely accurate rectangular pulse which is switched between $(V/2)(1+m)$ when Q5 is on and Q6 is off, and $(-V/2)(1+m)$ when Q5 is off and Q6 is on. The average value of $V_R$ has been shown to equal $(-V/2)(1+m)$ F. This minus sign is created in Z8 by reversing the driver arrangement of Z7 so that the pulses are negative instead of positive. Thus the summation circuit 44 can perform subtraction by adding the two signals.

One reason for the simplicity and extreme accuracy of this invention is the capability to eliminate the two low-pass filters which would normally be used to demodulate these data and reference channel pulses prior to their addition.

Because the process of low-pass filtering is mathematically a linear process, theoretically there should be no difference between 1. filtering two signals and then adding them to form the sum, or
2. adding two signals and then filtering the sum.

If one denotes the filtering process by K, then the equivalent mathematical statement would simply be $$KA + KB = K(A+B)$$

The summation expressed by the $KA+KB$ term need not be highly linear outside of the bandwidth represented by the filtering process K. However, to accurately perform the $K(A+B)$ summation requires that the process be extremely linear essentially over the frequency spectrum of the signals to be added. Any nonlinearity will generate intermodulation distortion products which will appear as unwanted noise signals at the sum and difference frequencies of the added signals, if the sum and difference frequencies fall within the bandwidth of the filter. Because A and B are in reality ultra-accurate, fast rise-and-fall time pulse waveforms containing harmonics from the fundamental frequency of a few thousand Hertz up into the megahertz region, the summation of these signals must be of exceptional linearity over a comparable bandwidth. Any attempt to perform this summation with active circuitry (such as with operational amplifiers) prior to any filtering of the waveforms would fail dismally due to the gross non-linearities encountered at increasing frequencies. For this reason the actual summation is performed by two simple resistors, which are inherently highly linear over an extremely wide bandwidth.

The effective source impedance of each "switch" with respect to the summing node (denoted as 50) is 15 k ohms ($\pm 1$ percent) plus the resistance of the particular field-effect transistor which is conducting at the time. Field-effect transistors of maximum-on-resistance equal to 50 ohms were chosen because variations in their on-resistances would be small compared to 15 k ohms. The actual resistances of the transistors is relatively unimportant. The only requirement for a high degree of linearity is that the transistors driving the summing junction be 1. matched on a "side" (i.e., Q3 to Q4, Q5 to Q6), or
2. symmetrically mismatched.

The linearity of the summation network can be observed by supplying to the frequency inputs a data and reference frequency separated in frequency by a number of Hertz less than the bandwidth of the output filter so that whatever intermodulation noise is generated at the difference frequency may be observed at the output with a high-gain oscilloscope. For example, a 3000 Hz and a 3010 Hz signal will cause residual circuit nonlinearities to generate a 10 Hz intermodulation noise signal of very small amplitude, typically about $-66$ db peak-to-peak (all "db" figures mentioned are with respect to a maximum peak-to-peak output signal for $\pm 50$ percent modulation). Although this figure is exceedingly small (1 part in 2000) it was desired to obtain a residual-system-noise figure well below this level. For this reason, R47 and potentiometer R48 were added. R48 is adjusted for minimum intermodulation noise at the output, in effect creating a symmetrical mismatch of the driving impedances. This simple adjustment reduces the intermodulation-distortion products generated by residual non-linearities in the summation circuitry to the insignificant level of $-80$ db, or 1 part in 10,000. This adjustment would be unnecessary in all but the most critical of applications.

The feedback filter 29 is a 4 pole filter; a 3-pole Chebyshev active filter (Z9) followed by a single pole, R35 and C20. (The single pole permits simple, predictable modifications of the filter response, if desired, by merely changing R35). The primary purpose of this filter is to attenuate the frequencies generated at the summing node. Any residual data carrier or reference carrier frequencies at the output are circulated in the feedback network as noise on the two switching voltages $[(\pm V/2)(1+m)]$ used by the reference channel, and will be demodulated by the sampling action of the reference bipolar switch formed of transistors Q5 and Q6. The net effect is similar to that produced by non-linearities in the summing circuitry in that a small residual difference-frequency signal will exist on the output signal. The amplitude of this noise signal is approximately equal to the amount of attenuation provided by the feedback filter to the data and reference channel frequencies. This filter, therefore, exhibits better than 70 db of attenuation at 6 kHz to maintain the residual system noise at an insignificant level. It is, of course, possible to filter one or both of the signals to be added before the adder network. However, to do so would be unwise from an economic standpoint, since each signal would require a separate filter, whereas both signals benefit from the action of the feedback filter.

The effect of phase shift (time delay) in the feedback filter 29 is to generate a small instantaneous amplitude error in the switching voltages of the reference bipolar switch. The overall effect is the generation of a small gain error in the data output which is a function of the data frequency and the cumulative record-playback flutter. Even with a feedback filter 29 bandwidth as low as the output filter 32 bandwidth (typically 100 Hz), this effect is small in that it requires a 30 percent flutter to generate a few percent peak-to-peak gain error in the amplitude of a ±full scale 100 Hz signal. This effect can be made insignificant by increasing the bandwidth of the feedback filter and thereby decreasing its phase shift for any particular frequency, retaining of course, the necessary attenuation required for the data and reference carriers. For this reason, the feedback filter shown has a wider bandwidth than the output filter, with appreciable attenuation starting for frequencies approaching 1 KHz. The Chebyshev section provides a small peak in the filter response to improve the phase-shift characteristic. This reduced phase-shift (compared to the output filter phase-shift) reduces the gain error in a ±full scale 100 Hz data signal to well below 1 percent for a flutter of 30 percent, which is approximately 30 times the flutter that would be expected in normal situations. (Phase correction circuitry could be incorporated here but its use would be unwarranted in all but the most critical applications.)

The low-pass output filter 32 indicated on the schematic is also a 3-pole Chebyshev filter due to the more effective filtering provided over a standard 3 pole Butterworth filter, at the expense of absolute flatness in the frequency response characteristic. The actual number of poles, filter flatness, type, and bandwidth is dependent on the requirements of the application. In this circuit a filter bandwidth of from 0 to 100 Hz with an accuracy of ±0.1 db was typical. It must be remembered that nonlinearities in the filter response will, of course, demodulate flutter-modulated input signals, resulting in amplitude modulation of the output. This is a consideration when determining output filter requirements and overall system gain accuracy.

Z13, the offset subtractor, and X2 data amplifier 33, is an operational amplifier configured for a positive gain of 2 with respect to the data signal, and a negative gain of one with respect to the voltage reference V. This circuit subtracts the "dc" offset of V/2 from the data signal and multiples the data by two so that the final output signal is Vm. An adjustment is provided so that the "dc" offset of the output may be precisely set to 0.000 volts. This circuit could be followed by a variable-gain stage to vary the output amplitude, if such a feature is desired.

One technique to initially set up the noise-reducing circuitry for proper operation is as follows:

1. Ground the signal input to the recorder and adjust the center frequency of the data oscillator and the reference oscillator for the desired frequencies.

2. Switch the circuitry to a "Monitor" mode which connects the recording frequencies to the inputs of the demodulation circuitry, and switch on the flutter noise reduction system.

3. Using R18, adjust the pulse width of the data monostable multivibrator so that the $V_D$ test point equals 2.500 volts as measured with a digital voltmeter. (It is assumed that the +V voltage reference equals +5 volts).

4. Similarly adjust R25 so that the voltage at the $V_R$ test point measures 0.000 volts. (These adjustments insure that the pulse generators have about a 50 percent duty cycle at the center frequencies.)

5. Record 20 seconds of tape leaving the input to the data channel grounded—that is a "baseline" signal which should generate a 0.000 volt output.

6. Playback this signal while monitoring the voltage at the output of the feedback filter which will be approximately 2.5 V (2.500 V±a few millivolts).

7. Introduce gross amounts of flutter (by either physically slowing down the recorder's capstan, or by turning on and off the power to the tape-drive motor) and adjust R37, the flutter noise adjustment, so that the voltage at the loop filter output does not change while the tape is experiencing these speed variations.

8. Adjust the ZERO potentiometer (R45) so that the output signal is 0.000 volts while playing back the "baseline" signal.

Recorders in use today which are capable of peak-to-peak signal-to-noise ratios approaching 50 db are in the several thousand dollar price range, and are sorely pressed to attain even the 50 db mark, with or without present forms of flutter compensation. Use of this invention enables a $50 audio cassette recorder operating at 1⅞ inches per second, to reproduce frequency modulated data with a peak-to-peak signal-to-noise ratio of better than 60 db over a flat bandwidth of from 0 to 100 Hz. This is several times better than can be presently obtained by any recorder regardless of cost operating at twice the tape speed.

The invention works so well in eliminating the effects of tape speed variation, that if one is willing to accept gross variations in the time base accuracy of the data, the 60 db figure can be reached even by turning the recorder motor by hand.

As previously mentioned, the flutter removal is essentially independent of the flutter frequency, and is virtually unaffected by temperature variations, etc., which might cause small variations in the recorded frequencies or in the width of the monostable pulses. Such effects result primarily in minute changes in gain accuracy, and in small output offset voltages.

The fact that this invention eliminates complete demodulation of the reference channel results in the total demodulation system requiring little additional circuitry over what would have been required to demodulate the FM data signal without any flutter-reduction system.

Variations in the characteristics of the feedback filter make little overall difference because the filter is, in fact, common to both the data and reference channels. In fact, the output filter can be moved to the position of the feedback filter, and the feedback filter discarded, with no "baseline" signal-to-noise ratio degradation and with only a slight degradation of system gain accuracy, and only at high data frequencies and amplitudes.

Of interest is the effect generated when the reference frequency is offset from the data center frequency, say from 3000 Hz to 3500 Hz. In such a situation the system would be capable of producing extremely high "baseline" signal-to-noise ratios even with inadequate filtering of the summation signal by the feedback filter, say only 45 or 50 db. This is because the intermodulation noise products generated at the difference frequency would fall outside of the bandwidth of a 100 Hz output filter, and be further attenuated by the output filter.

The only flutter noise which this system cannot remove is non-coherent flutter, i.e., tape speed variations not common to both the data and reference channels. Such flutter is generated by two factors, namely a. dynamic skewing of the tape, b. non-uniform dynamic stretching of the tape.

This system is insensitive to tape skew, so long as it doesn't adversely affect playback voltages, because a deviation in the angle of the tape as it moves past the playback head doesn't affect the frequencies of the signals. Only dynamic skewing which is proportional to the rate of change of the skew angle will generate an instantaneous relative frequency error between two tracks. This factor accounts for over half the residual flutter noise and is caused by relatively low frequency (less than 10 Hz) dynamic skewing of the 0.150 inch wide cassette tape as it crosses the playback head, since the simple cassette recorder that was used had but a single and rather ineffective metal guide at the side of the head. This effect could be reduced by providing better guiding of the tape. A small portion of the residual flutter noise is due to minute amounts of non-coherent stretching of the magnetic tape, since it is a non-homogeneous elastic medium under varying degrees of tension. This effect generates higher frequency flutter noise than does dynamic skewing, but even with the thin and narrow tapes in Phillips' cassettes this effect is still essentially negligible. Of course, residual noise due to non-coherent flutter could be eliminated by multiplexing the reference frequency onto the same physical track as the data channel. However, it would appear that the minute relative improvement would rarely justify the increase in circuit complexity and cost.

The removal of flutter with this system is in fact so complete that the invention can also be used as a means to test and evaluate the dynamic skewing characteristics of various tape transports with an extreme degree of accuracy.

Of special importance is the fact that this invention requires no special amplitude or frequency-dependent contouring of the recorded or reproduced signals, i.e., that no pre-emphasis/de-emphasis or similar compression/expansion techniques are employed in the flutter elimination process. Thus the recorder using this system is capable of reproducing data with a flat frequency/amplitude transfer characteristic, and is thereby classified as an instrumentation recorder and not as a special purpose, limited-use device.

For this reason, the technique described in this invention may be applied to virtually any existing recorded FM data in the world which has been recorded with a reference channel, to remove flutter amplitude noise from old recordings with a degree of accuracy thought impossible to obtain until now. This invention will be of vital importance to applications employing extremely low tape speeds, as the relative effect of the flutter becomes very large as the velocity of the tape approaches zero.

It is highly probably that the basic circuitry of the invention will eventually be incorporated into a single integrated circuit, with pins for the external connection of the input frequencies and the appropriate filtering and adjustments.

Figure 10:
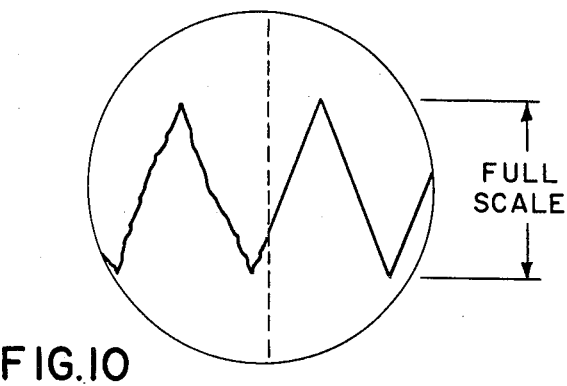
FIG. 10 is a view of an oscilloscope screen showing the result of the present invention on a full-scale, sawtooth signal, recorded on an inexpensive tape transport.
Figure 11:
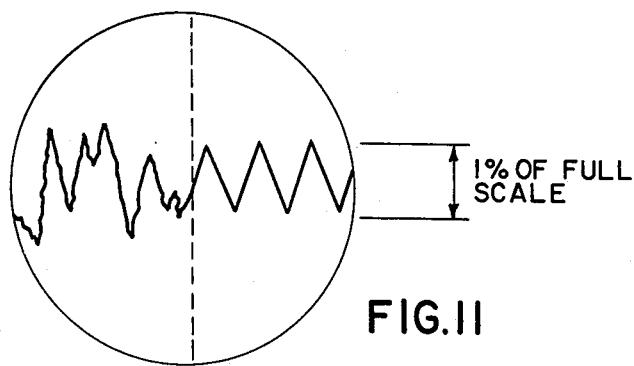
FIG. 11 is a view of an oscilloscope face showing the effect of the present invention on a one percent of fullscale, saw-tooth signal, recorded on an inexpensive tape transport.
Figure 12:
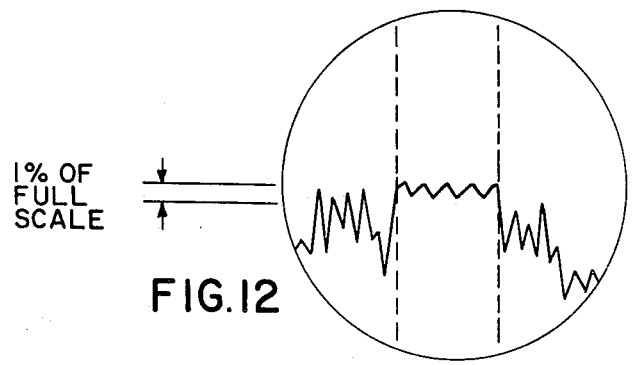
FIG. 12 is a view of an oscilloscope face showing the effect of the present invention on the same one percent of fullscale, saw-tooth signal played back with gross amounts of artificially induced flutter.

The efficacy of the present invention in reducing amplitude flutter noise is shown in FIGS. 10, 11 and 12. FIG. 10 shows the face of a cathode ray-tube oscilloscope displaying the output signal generated from an inexpensive tape transport recording of a 4 Hz saw-tooth signal of full-scale amplitude. To the left, is the noticeably distorted output before the invention is switched into the system. To the right, the flutter noise is eliminated.

More important, however, is the output of a tiny saw-tooth signal of only one percent of full-scale amplitude as shown in FIG. 11. To the left, the signal is virtually obliterated by the normal flutter noise inherent in the tape moving mechanisms. Switching in the noise reducer eliminates nearly all of the flutter noise as shown to the right.

FIG. 12 shows the output of the same signal as in FIG. 11 but with massive flutter introduced by physical interference with the tape transport. Between the two dashed lines, the invention is switched in, thereby eliminating nearly all of the flutter noise even in this grotesque situation. From this example it should be clear that even extreme low quality of the tape transport will have little effect on the quality of the output signal, other than the effect gross deviations in tape speed have on the time base accuracy of the output, visible in FIG. 12 as variations in the frequency of the saw-tooth waveform.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Apparatus for producing a signal which varies as the ratio of the frequency of a first, frequency stream to the frequency of a second, frequency stream, the apparatus comprising:
 (a) a first-stream frequency-discriminating means which transforms said first, frequency stream into a third signal of value proportional to the frequency of said first stream,
 (b) a second-stream frequency-discriminating means which multiplies said second, frequency stream by a feedback value to form a fourth signal of value proportional to the product of said second-stream frequency times said feedback value,
 (c) a combining means which combines the third and fourth signals and generates an output value proportional to the feedback value, and
 (d) a feedback loop which returns said feedback value to the second-stream frequency-discriminating means, whereby the feedback loop in said apparatus causes the output value to vary in a manner which is proportional to the ratio of the first-stream frequency divided by the second-stream frequency.

2. Apparatus for producing a signal which varies as the ratio of the frequency of a first stream to a second stream, the apparatus comprising:
 (a) a first stream frequency-discriminating means which transforms the first stream into a first signal of value proportional to the frequency of the first stream;
 (b) a second stream frequency-discriminating means which effectively performs both frequency discrimination and multiplication, and which essentially multiplies the incompletely demodulated second stream by a feedback value to form a second signal of value proportional to the product of the second stream frequency times the feedback value;
 (c) a combining means which combines the first and second signals and generates an output value proportional to the feedback value; and
 (d) a feedback loop which returns the feedback value to the second stream frequency-discriminating means, so that the feedback loop in the apparatus causes the output value to vary in a manner which is proportional to the ratio of the first stream frequency divided by the second stream frequency.

3. The apparatus of claim 2, wherein, in the second stream frequency-discriminating means, the discrimination is accomplished by switching an input signal to the reference stream frequency discriminating means at a rate proportional to reference stream frequency, and the multiplication is accomplished by varying the amplitude of the input signal in accordance with the amplitude of the feedback value.

4. A method of producing a signal which varies as the ratio of the frequency of a first stream to a second stream, the method comprising:
   (a) accomplishing frequency-discrimination of the first stream, by transforming the first stream into a first signal of value proportional to the frequency of the first stream;
   (b) accomplishing frequency-discrimination and multiplication of the second stream, by transforming the second stream into a second signal of value proportional to the product of the second stream frequency times a feedback value;
   (c) combining the first and second signals to produce an output value proportional to the feedback value; and
   (d) returning the feedback value to step (b), so that the feedback loop in the method causes the output value to vary in a manner which is proportional to the ratio of the first stream frequency divided by the second stream frequency.

5. The method of claim 4, wherein step (b) includes substeps as follows:
   (1) switching an input signal at a rate proportional to the reference stream frequency, thereby accomplishing frequency discrimination; and
   (2) varying the amplitude of the input signal in accordance with the amplitude of the feedback value, thereby accomplishing multiplication.

* * * * *